United States Patent
Sheng et al.

(10) Patent No.: US 8,924,338 B1
(45) Date of Patent: Dec. 30, 2014

(54) AUTOMATED PREDICTIVE TAG MANAGEMENT SYSTEM

(71) Applicant: FMR LLC, Boston, MA (US)

(72) Inventors: Xinxin Sheng, Cary, NC (US); Hong Sun, Cary, NC (US); Stuart Te-Hui Shih, Raleigh, NC (US); Junjie Lu, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/301,956

(22) Filed: Jun. 11, 2014

(51) Int. Cl.
*G06F 9/44* (2006.01)
*G06N 7/02* (2006.01)
*G06N 7/06* (2006.01)
*G06F 17/30* (2006.01)
*G06N 99/00* (2010.01)
*G06N 5/04* (2006.01)

(52) U.S. Cl.
CPC .......... *G06F 17/3089* (2013.01); *G06N 99/005* (2013.01); *G06N 5/04* (2013.01)
USPC ........................................................ 706/52

(58) Field of Classification Search
None
See application file for complete search history.

(56) References Cited

U.S. PATENT DOCUMENTS

| | | | |
|---|---|---|---|
| 8,315,849 B1 | 11/2012 | Gattani et al. | |
| 2007/0288589 A1* | 12/2007 | Chen et al. | 709/217 |
| 2009/0012969 A1* | 1/2009 | Rail et al. | 707/100 |
| 2009/0248608 A1* | 10/2009 | Ravikumar et al. | 706/55 |
| 2010/0312728 A1* | 12/2010 | Feng et al. | 706/12 |
| 2011/0302162 A1 | 12/2011 | Xiao et al. | |
| 2012/0117092 A1 | 5/2012 | Stankiewicz et al. | |
| 2012/0179696 A1 | 7/2012 | Charlot et al. | |
| 2013/0144874 A1 | 6/2013 | Koperda et al. | |
| 2013/0191391 A1 | 7/2013 | Pradhan et al. | |
| 2013/0317808 A1 | 11/2013 | Kruel et al. | |

OTHER PUBLICATIONS

Web Page Classification Based on k-Nearest Neighbor Approach Oh-Woog Kwon and Jong-Hyeok Lee Proceedings of the 5th International Workshop Information Retrieval with Asian Languages Copyright ACM 1-58113-300-6/00/009 . . . S5.00.*
Document Object Model (DOM) Level 3 Core Specification Version 1.0, W3C Working Draft Sep. 13, 2001 Editors: Arnaud Le Hors, Philippe Le Hégaret, Gavin Nicol, Lauren Wood, Mike Champion, Steve Byrne.*

* cited by examiner

*Primary Examiner* — Kakali Chaki
*Assistant Examiner* — Luis Sitiriche
(74) *Attorney, Agent, or Firm* — Proskauer Rose LLP

(57) ABSTRACT

Described are methods and apparatuses, including computer program products, for automatically updating a tag embedded in a webpage that summarizes a current version of the webpage. A first model representative of the current version of the webpage is extracted. The first model is compared with a second model corresponding to a previous version of the webpage to detect one or more changes to the webpage. If the changes exceed a threshold, at least one keyword is determined for to the current version of the webpage. The tag of the webpage can be updated to include the keyword.

22 Claims, 5 Drawing Sheets

US 8,924,338 B1

AUTOMATED PREDICTIVE TAG MANAGEMENT SYSTEM

FIELD OF THE INVENTION

The invention generally relates to computer-implemented methods and apparatuses, including computer program products, for automatically updating at least one tag embedded in webpage to accurately summarize a current version of the webpage.

BACKGROUND

Digital measurement is a business function where companies collect information about how users perform certain activities on webpages or otherwise interact with published web content. These users may be referred to as digital content consumers. Companies that publish web content, known as digital content providers, have an interest in understanding what and how their content is consumed by collecting usage statistics from the digital content consumers. Digital measurement based on the gathered usage statistics can provide insight about customers, thereby improving a company's decision making in areas such as targeted marketing, product testing, user analysis (e.g., pattern identification) and business model improvement. Exemplary usage statistics collected in digital measurement include consumer operations such as page access, link clicking, file downloading, completing a transaction, exiting a page, etc. Workflows for consumer activities can also be collected and analyzed to track common usage patterns among different consumer groups.

To collect usage statistics, webpages are pre-loaded with one or more descriptive tags. When a user accesses a webpage, the webpage asks its web server for associated tags describing the page. After obtaining the tag information from the web server, the webpage sends the tagged data to a data collection center for recordation and tracking. Generally, this type of tracking provides feedback to a company on how their webpages are used. As an example, a webpage associated with a financial institution can provide information about 529 college savings plans and the corresponding tag can include the following keywords describing the webpage:

<meta name="page description" keywords="529 plans, 529 college savings plans, 529 college savings plans, college savings plans, saving for college, college savings, 529 tax, 529 plan application, 529 savings plan, college 529">

For measurement purposes, the topic of the page corresponding to the keywords in the tag is provided as follows:

Page topic=Financial Planning|Investing Strategies|529 plan

When the webpage is accessed, a measurement mechanism can maintain a running total of user interests in the topics corresponding to the tag and increase this total by one with each access. If this is the only webpage across the company's web site about 529 plans and the page is accessed 10,000 times during a given day, the data in the data collection center can show that the topic "529 plans" has been viewed 10,000 times. Therefore, by analyzing the usage metrics (e.g., page accesses) across the entire web site, a measurement mechanism is able to determine which topics are of interest to the consumers.

To ensure that the collected data accurately describes consumer activities with respect to a webpage, tags associated with the webpage need to correctly represent the page content. Tags that are initially reviewed and deemed to be accurate can lose their accuracy over time if they are not updated when significant modifications occur to the webpage. If a tag no longer reflects the content of the webpage, this can affect the validity of the resulting data collected and invalidate further analytics based on the collected data. Invalid data can result in incorrect business decisions being made, such as management focusing on the wrong business priorities, a supply chain department maintaining the wrong inventories, or a marketing department running a marketing campaign of little consumer interest. Therefore, data provided by digital measurement needs to accurately capture actual consumer behavior.

Webpage owners can choose to manually update tags associated with a page when the page is edited. However, in cases where the content of a webpage can be changed by many different groups within a company, constantly reviewing the tags of a page to ensure that they are accurate is not only time and resource intensive, but also error-prone. There is a lack of system on today's market that can provide automated tag review and update to solve this problem.

SUMMARY OF THE INVENTION

Therefore, systems and methods are needed to provide automated tag review and update in response to changes in the content of a webpage. The present technology can provide an automated predictive tag management system that periodically reviews tags, automatically updates the tags with correct values, and notifies the system owners about an update event.

In one aspect, a computer-implemented method is provided for automatically updating a tag embedded in a webpage that summarizes a current version of the webpage. The method includes extracting, by a computing device, a first model representative of the current version of the webpage. The first model includes nodes defining a hierarchy of elements of the current version of the webpage. The first model is compared with a second model corresponding to a previous version of the webpage to detect one or more changes to the webpage. The method also includes determining at least one keyword corresponding to the current version of the webpage if the changes exceed a threshold. Determining the keyword comprises extracting an item set of words or phrases from the current version of the webpage, selecting a rule from a trained set of rules based on the item set of extracted words or phrases, the rule defining (1) an association of the item set to a keyword and (2) a property vector that measures quality of the association, and computing a maximum likelihood score based on the property vector corresponding to the selected rule. The maximum likelihood score represents a probability of relationship between the selected rule and the corresponding keyword. The method also includes comparing, by the computing device, the keyword corresponding to the current version of the webpage with at least one keyword corresponding to the previous version of the webpage. The method further includes updating, by the computing device, the tag of the webpage to include the keyword corresponding to the current version depending on the comparison and the likelihood score.

In another aspect, a computer-implemented system is provided for automatically updating at least one tag embedded in a webpage that summarizes a current version of the webpage. The system comprises a scope difference determination module, a content prediction module and a post processing module. The scope difference determination module is configured to retrieve a first model representative of the current version of the webpage, where the first model includes nodes defining a hierarchy of elements of the current version of the webpage. The scope difference determination module is also configured to compare the first model with a second model corresponding to a previous version of the webpage to detect one or more changes to the webpage. The content prediction module is configured to determine at least one keyword corresponding to the current version of the webpage if the changes exceed a threshold. The content prediction module comprises a decision making module configured to extract a set of words or phrases from the current version of the webpage, select a rule from a trained set of rules based on the extracted word or phrase, where each rule defines (1) an association of two or more words or phrases to a keyword and (2) a property vector that measures quality of the association. The decision making module is also configured to compute a maximum likelihood score based on the property vector corresponding to the selected rule. The maximum likelihood score represents a probability of relationship between the selected rule and the corresponding keyword. The post processing module is configured to compare the keyword corresponding to the current version of the webpage with at least one keyword corresponding to the previous version of the webpage and update the tag of the webpage to include the keyword corresponding to the current version based on the comparison and the likelihood score.

In yet another aspect, a computer program product, tangibly embodied in a non-transitory computer readable medium, is provided for automatically updating at least one tag embedded in a webpage that summarizes a current version of the webpage. The computer program product including instructions being configured to cause data processing apparatus to retrieve a first model representative of the current version of the webpage. The first model including nodes defining a hierarchy of elements of the current version of the webpage. The computer program product also causes data processing apparatus to compare the first model with a second model corresponding to a previous version of the webpage to detect one or more changes to the webpage and determine at least one keyword corresponding to the current version of the webpage if the changes exceed a threshold. Determining at least one keyword includes extract a set of words or phrases from the current version of the webpage, select a rule from a trained set of rules based on the extracted word or phrase, each rule defining (1) an association of two or more words or phrases to a keyword and (2) a property vector that measures quality of the association, and compute a maximum likelihood score based on the property vector corresponding to the selected rule. The maximum likelihood score represents a probability of relationship between the selected rule and the corresponding keyword. The computer program product further causes data processing apparatus to compare the keyword corresponding to the current version of the webpage with at least one keyword corresponding to the previous version of the webpage and update the tag of the webpage to include the keyword corresponding to the current version depending on the comparison and the likelihood score.

In other examples, any of the aspects above can include one or more of the following features. In some embodiments, each of the first model or the second model is a document object model (DOM). The keyword corresponding to the current version of the webpage is associated with a node of the first model.

In some embodiments, an owner of the webpage is notified when the tag of the webpage is updated to include the keyword. The post processing module can perform such notification function. The post processing module can also permit manual edit of the keyword corresponding to the current version of the webpage if the likelihood score is lower than a threshold. In some embodiments, the post processing module can prohibit updating of the tag of the webpage if the keyword corresponding to the current version of the webpage is substantially the same as the at least one keyword corresponding to the previous version of the webpage.

In some embodiments, at least one of the first model, the second model, the keyword corresponding to the current version of the webpage, the keyword corresponding to the previous version of the webpage or the trained set of rules is stored in a data repository. The data repository can store the keyword in correlated to a respective node of the first model and a webpage version.

In some embodiments, the content prediction module further includes a training module configured to generate the trained set of rules. The training module is configured to extract a set of elements from a set of known webpages, where each element corresponds to a word or phrase appearing in one of the known webpages, determine a set of keywords, where each keyword categorizes at least one of the set of known webpages, and determine an initial set of rules, where each rule maps an element in the set of elements to at least one keyword in the set of keywords. The training module is also configured to generate, at a first level, (1) a candidate set of elements by pruning the set of elements to eliminate one or more insignificant elements based on a plurality of constraints, (2) a first set of rules, each rule mapping an element in the candidate set to a keyword based on the initial set of rules, and (3) a first set of property vectors measuring quality of mapping of the first set of rules. The training module is further configured to generate, at each of one or more additional levels, (1) a superset of entities formed by iteratively combining two or more elements of the candidate set, each entity in the superset comprising two or more of the elements; (2) a superset of rules, each rule mapping an entity to a keyword based on the initial set of rules; and (3) an additional set of property vectors measuring quality of mapping of the superset of rules. The trained set of rules comprises the first set of rules and the superset of rules created at each of the one or more additional levels.

In some embodiments, an analyzer is provided to detect user access to the current version of the webpage and update a running total for the keyword based on the user access, wherein the running total measures an extent of user interest in a topic corresponding to the keyword.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DESCRIPTION OF THE INVENTION

Systems and methods of the present technology provide automated predictive tag management for one or more webpages. In some embodiments, a webpage is periodically and automatically reviewed for change(s). If substantially change(s) to the webpage are detected, an automated decision is made regarding whether the change(s) are likely to result in a tag of the webpage being updated. If a tag is updated, relevant personnel (e.g., a system or webpage owner) can be notified about the modification and can request manual review or overwrite to the tag values.

Figure 1:
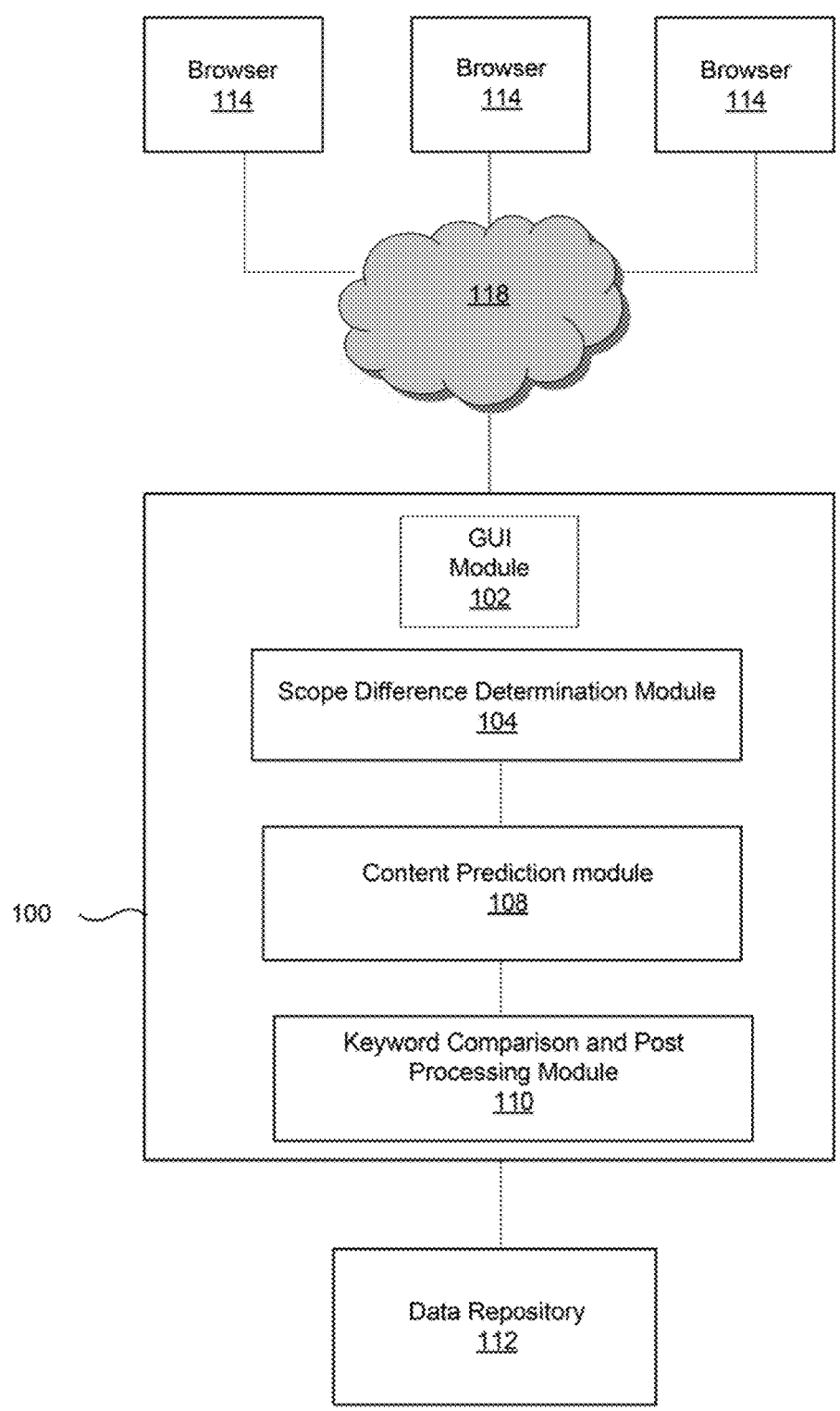
FIG. 1 shows an exemplary tag management system in an illustrative network environment.

FIG. 1 shows an exemplary tag management system in an illustrative network environment. The network environment includes multiple user devices 114 configured to communicate with the tag management system 100 via an IP network 118, such as a LAN, WAN, cellular network, or the Internet. A client application installed on each of the user devices 114 allows the user to view a webpage and manage tag updates to the webpage. In some embodiments, a user can overwrite automatic updates to a webpage tag via a user device 114. Each of the user devices 114 can be a computing device, which refers to any device with a processor and memory that can execute instructions. Computing devices include, but are not limited to, personal computers, server computers, portable computers, laptop computers, personal digital assistants (PDAs), e-Readers, cellular telephones, e-mail clients, tablets and other mobile devices. The tag management system 100 can in turn communicate with a data repository 112 for retrieving and storing pertinent data.

The tag management system 100 includes one or more hardware modules configured to implement processes and/or software of the present technology. For example, the tag management system 100 can be executed on one or more hardware devices to implement the exemplary processes of FIGS. 2-5. As shown, the tag management system 100 includes a graphical user interface (GUI) module 102, a scope difference determination module 104, a content prediction module 108 and a keyword comparison and post processing module 110.

The GUI module 102 of the tag management system 100 can handle user access (e.g., login and/or logout), user administration (e.g., any of the administration functions associated with the support and/or management of the system 100), widget management (e.g., providing the end user with the capability to arrange and save preferences for display of data within the browser area), and/or other GUI services.

The scope difference determination module 104 determines the scope of differences between a current version of a webpage under review and a previous version of the same webpage. The module 104 can extract certain information from the current version that provides a basis for comparison with the previous version to determine if and what type of changes have occurred to the webpage. In some embodiments, the module 104 also determines whether keywords in a tag need to be updated for the current version of the webpage based on the extent of the differences determined between the current and previous versions. In some embodiments, the module 104 can interact with the other modules 108 and 110 of the tag management system 100 to instruct them about the next step based on the comparison result.

Figure 3:
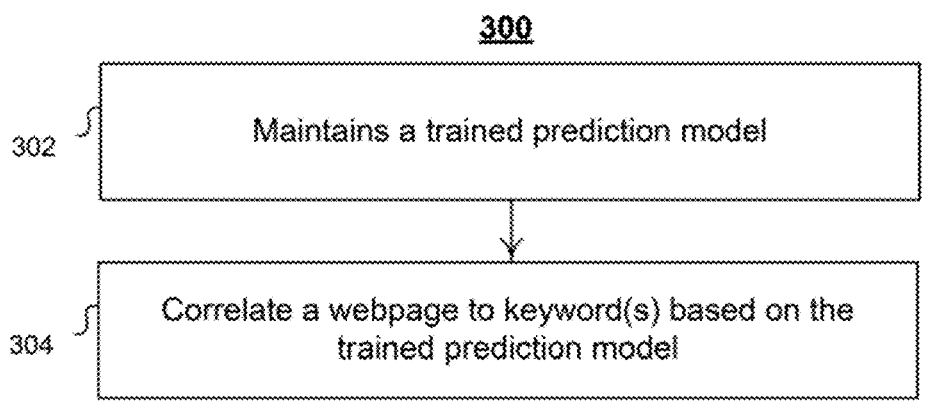
FIG. 3 shows an exemplary content prediction method for generating one or more keywords for a webpage.
Figure 4:
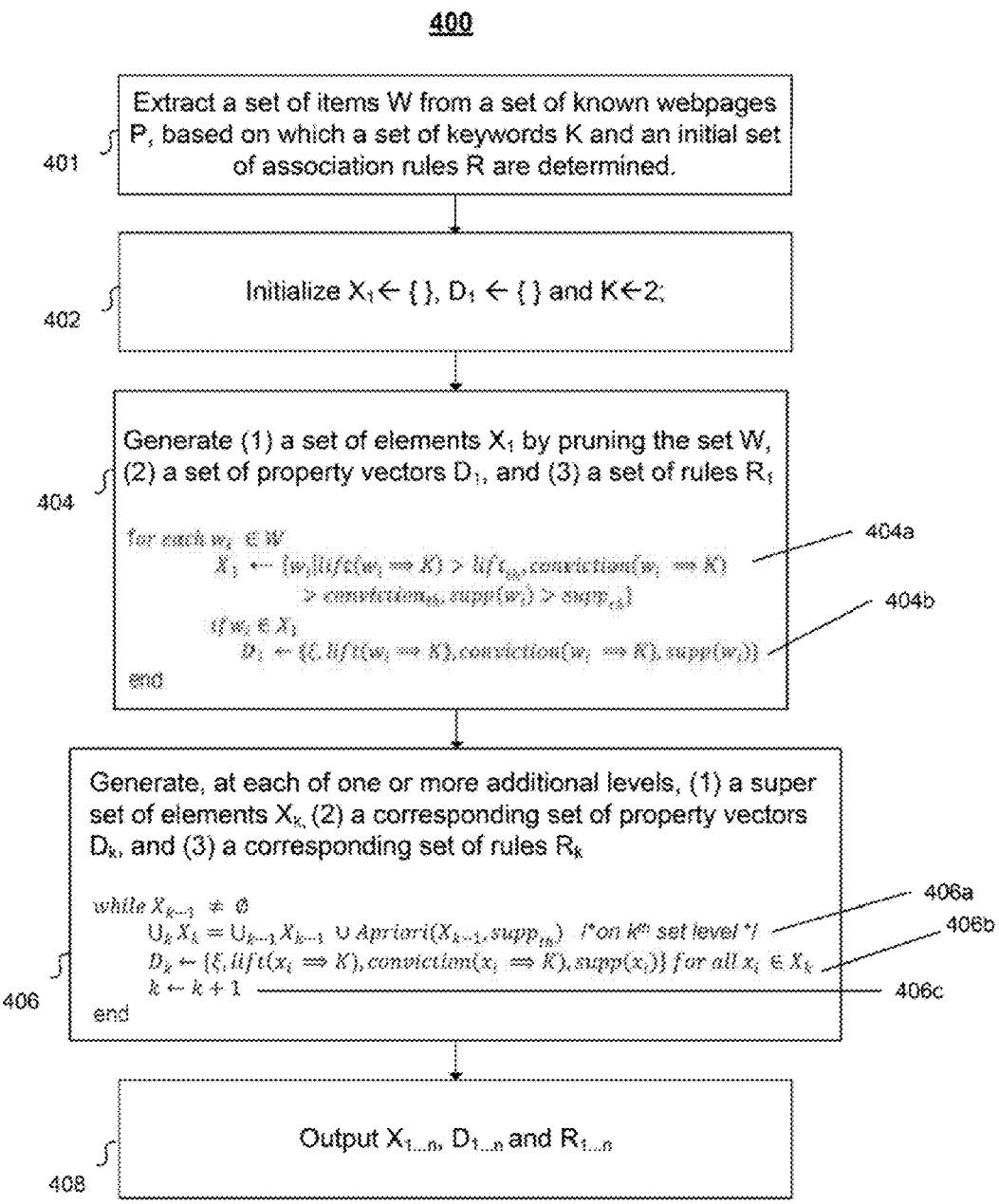
FIG. 4 shows an exemplary method for maintaining a trained prediction model.
Figure 5:
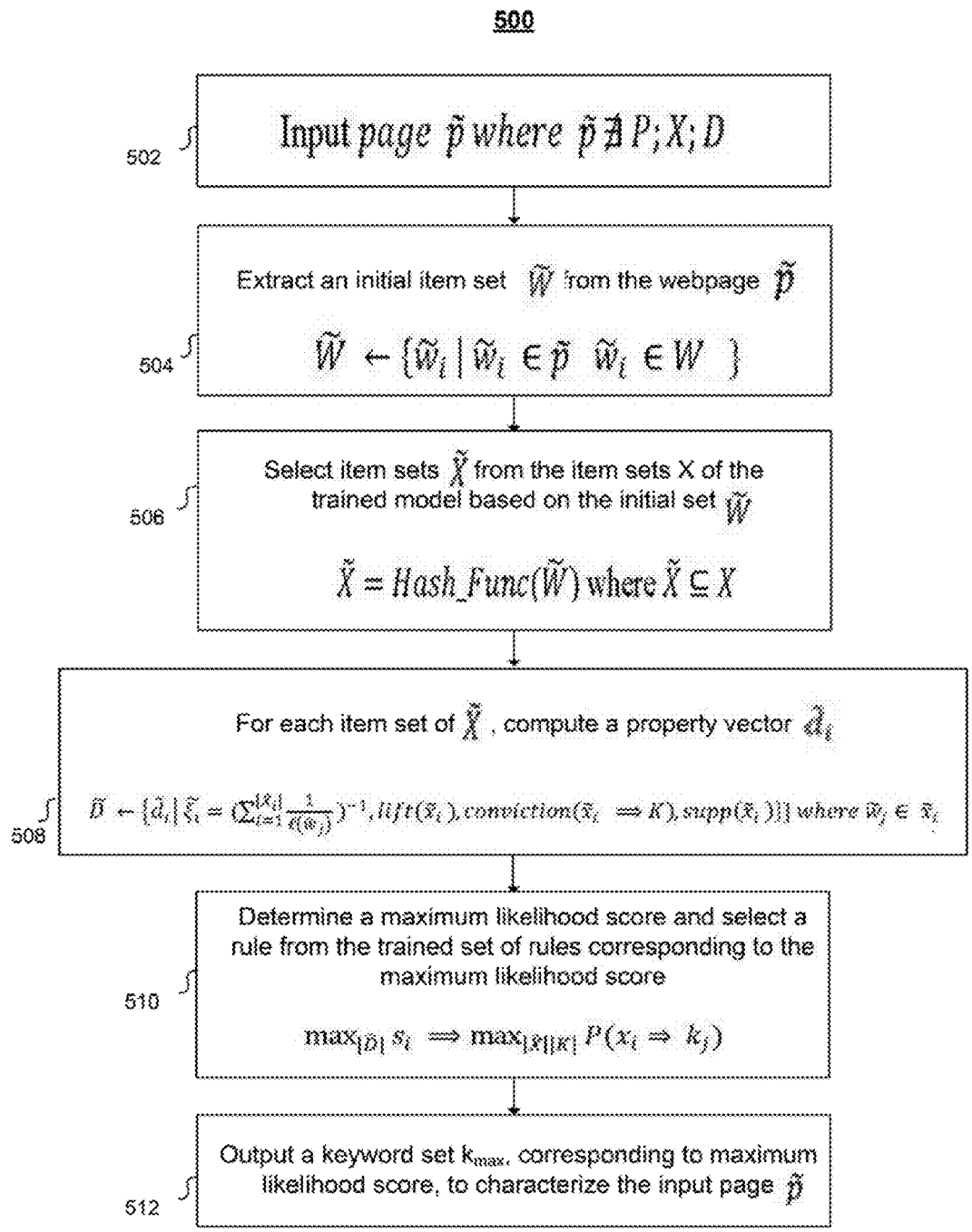
FIG. 5 shows an exemplary method for assigning one or more keywords to a given webpage based on the trained prediction model generated from the method of FIG. 4.

The content prediction module 108 analyzes and summarizes the content of a current version of a webpage by automatically generating one or more keywords using the exemplary processes of FIGS. 3-5. The keyword comparison and post-processing module 110 can compare the keywords for the current version of a webpage, as determined by the content prediction module 108, with saved keywords for a previous version of the same webpage. Based on the comparison, the module 110 can determine whether the tag for the webpage needs to be updated with new keywords to accurately capture the current webpage content. The module 110 can also implement several post-processing actions including alerting an owner of the webpage about the tag update, triggering manual review/modification by experts if the keywords automatically generated by the content prediction module 108 do not accurately characterize the webpage, and/or saving the new keywords to the data repository 112.

The data repository 112 can be a database configured to store extracted information associated with various versions of a webpage. In addition the data repository 112 can systematically store one or more listings that include keyword(s) characterizing the content of each version of the webpage. The data repository 112 can further store data pertinent to a prediction model usable by the content prediction module 108 to automatically determine one or more keywords for a given webpage.

Figure 2:
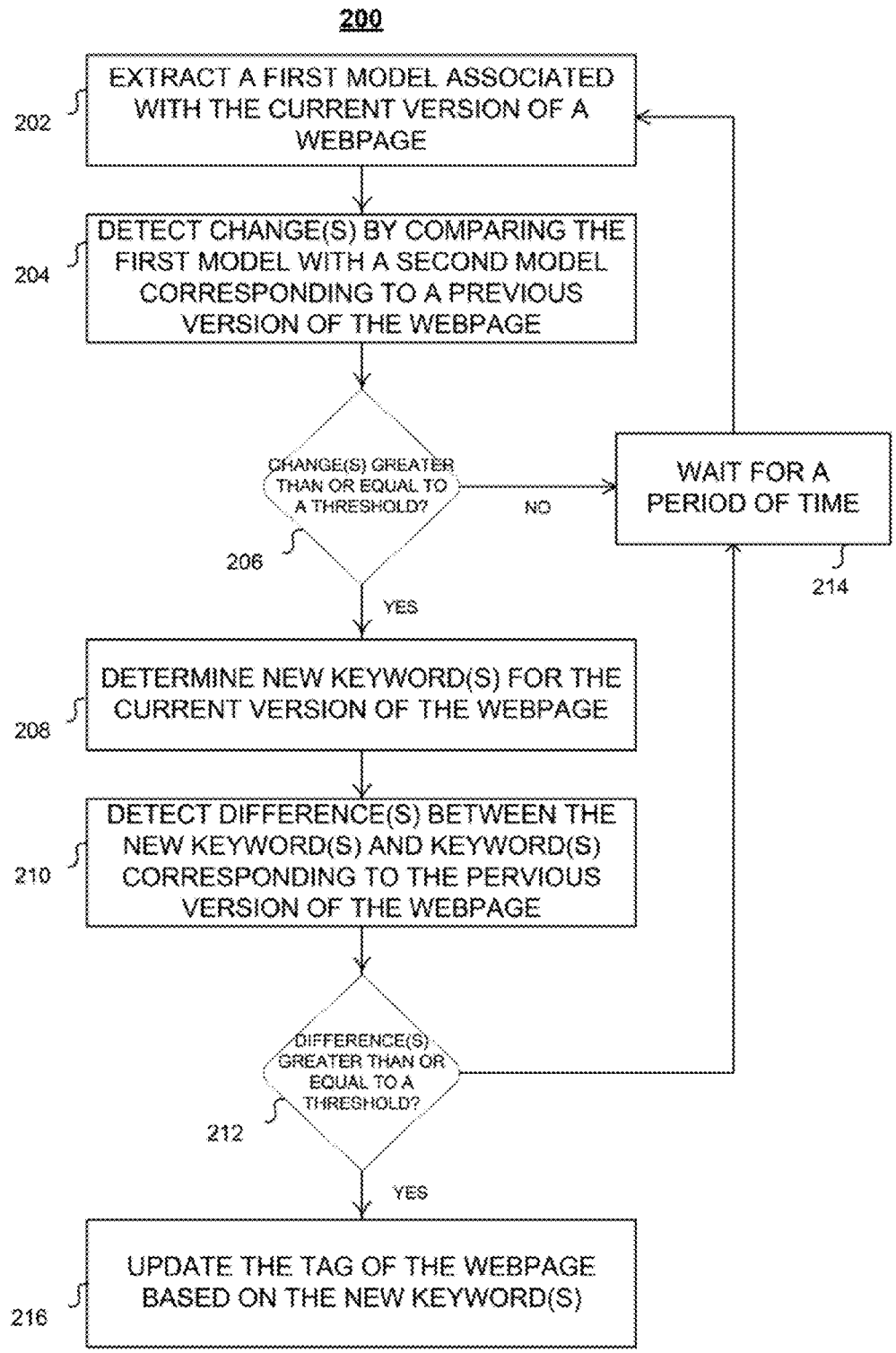
FIG. 2 shows an exemplary computerized process for automatically managing a tag associated with a webpage.

FIG. 2 shows an exemplary computerized process 200 for automatically managing a tag associated with a webpage. The process 200 is applicable to structured documents belonging to any topic domain by classifying the documents using an iterative learning process based on the semantic meaning of the document context. The steps of the process 200 are described using the exemplary management system 100 of FIG. 1. As shown, automatically managing a tag associated with a webpage includes extracting a first model associated with the current version of the webpage (step 202), detecting one or more changes by comparing the first model with a second model corresponding to a previous version of the same webpage (step 204) and determining if the changes are greater than a predefined threshold (step 206). If the changes are less than the threshold, the process 200 repeats from the beginning at step 202 after waiting for an appropriate amount of time (step 214), such as a day, a week, a month, etc. If the changes are greater than or equal to the threshold, the process 200 proceeds by determining one or more new keywords to capture the content of the current version of the webpage (step 208) and detecting any differences (step 210) between the new keywords generated from step 208 with the keywords previously generated for the webpage. If the differences are less than a second threshold (step 212), the process 200 repeats from the beginning at step 202 after waiting for an appropriate amount of time (step 214). If the differences are greater than or equal to the second threshold, the process 200 can update (step 216) a tag of the webpage with the new keywords generated from step 208 and perform other post-processing activities.

At step 202, the tag management system 100 extracts a model associated with the current version of a webpage. The webpage can be written as a HTML, XHTML or XML document. The model can be a Document Object Model (DOM) of the current version of the webpage that includes layout information, structure, content, style, and/or format of the current webpage version. Generally, a DOM model is a cross-platform, language-independent model for representing objects in a webpage. The DOM model organizes the objects in a hierarchy of nodes that captures the organization of the webpage. Each node can contain attributes (e.g., path information) and content (e.g., non-HTML elements) associated with objects at a level of the hierarchy. The higher a node is in the hierarchy, the more important the associated attributes and content are to the overall concept of the webpage. In addition, each node can be referenced by a DOM path that indicates where the node is positioned in the overall DOM hierarchy. For a webpage that is static in nature, the tag management system 100 can create a DOM model based on the page stored in a source control tool. For a webpage that produce dynamic content generated on the web/application server (e.g. ASP, JSP, etc.), the tag management system 100 can make a request to the server at a certain point in time to produce a snapshot of the page, based on which the tag management system 100 can create a corresponding DOM model. After a DOM model is generated for a particular version, the tag management system 100 can store the DOM model in the data repository 112 along with an indication of when the model is generated and/or the version number.

At step 204, the tag management system 100 retrieves a second DOM model (e.g., stored in the data repository 112) that corresponds to an older version of the same webpage. For example, the second DOM model can be created for the webpage at an earlier point in time. The tag management system 100 can compare the DOM models for the current and previous versions to detect any differences between them. A text comparison tool can be used to determine the differences. For example, the tag management system 100 can run a XML parser on each of the DOM models for the purpose of performing comparison. In some embodiments, the differences are weighted such that those differences occur at a node higher in the DOM hierarchy are weighed more (i.e., more important) than those differences that appear lower in the hierarchy.

At step 206, if the tag management system 100 determines that the differences between the two DOM models (from step 204) are less than a predefined threshold, the tag management system 100 stops execution of the process 200 and waits for a certain period of time at step 214 before restarting the process 200 at step 202. If the changes are greater than or equal to the threshold, the tag management system 100 proceeds to perform the subsequent steps. Thus, the tag management system 100 can periodically evaluate the webpage to determine whether updates to its tags are needed. Particularly, by comparing the amount of changes with a predetermined threshold at step 206, the tag management system 100 is able to decide if the current version of the webpage has changed significantly enough to warrant tag updates. In some embodiments, steps 202, 204 and 206 of the process 200 are implemented by the scope difference determination module 104 of the tag management system 100.

If the changes to the current version of the webpage are greater than or equal to the threshold, this implies that substantial enough modifications have been made to the current version of the webpage to warrant further investigation. At step 208, the tag management system 100 proceeds to determine one or more new keywords to describe the current webpage content by analyzing the DOM model generated (from step 202) for the current version of the webpage. In some embodiments, the keywords are correlated to different nodes of the DOM model of the webpage to characterize the content at different hierarchical levels of the DOM model. The keywords are selected, based on a trained model, from a predefined and pre-classified keyword dictionary that can be created by domain experts. The keyword dictionary can be stored in and accessed from the data repository 112. FIGS. 3-5 describe an exemplary content prediction method for generating one or more keywords for a webpage. Additionally, the content prediction method can generate a likelihood score for the set of new keywords to reflect how well these keywords summarize the current webpage content. In some embodiments, step 208 is implemented by the content prediction module 106 of the tag management system 100.

At step 210, the tag management system 100 determines the scope of differences between the new keywords determined for the current version of the webpage and the previous keywords determined from a previous version of the same webpage. The previous keywords can be retrieved from the data repository 112 of the tag management system 100. The comparison can be node-wise comparison such that differences in keywords that occur at a higher node in the DOM hierarchy are assigned a higher weight than the differences occurring at a lower node. At step 212, if the scope of differences is greater than or equal to a predefined threshold, the system 100 can proceed to update the tag of the webpage (step 216) based on the new keywords determined at step 208. If the scope of differences is less a predefined threshold, this means that the changes in webpage content are not substantial enough to warrant an update. Therefore, the system can stop the process 200 and wait for a period of time (step 214) prior to evaluating the content of the webpage again from the beginning of the process 200. If tag updates are required, the tag management system 100 can retrieve the tag associated with the webpage and edit the tag to remove one or more obsolete keywords and/or add the new keywords. Steps 210, 212 and 216 of the process 200 can be implemented by the keyword comparison and post processing module 100 of FIG. 1.

In some embodiments, the tag management system 100 can prevent automatic update of a tag associated with a webpage at step 216 if the likelihood score associated with the newly generated keywords is lower than a threshold, thus indicating a low confidence in the correctness of the keywords to characterize the webpage content. In such a situation, the tag management system 100 can request expert review of the webpage and allow manual changes by experts to add and/or remove one or more of the keywords to better characterize the content. The edit can be used by the tag management system 100 to improve its training and automatic keyword generation methods.

In some embodiments, after the new keywords are determined at step 208, the tag management system 100 can apply a keyword weighting algorithm to determine the most relevant keywords from the pool of relevant keywords that characterize a webpage. The keyword weighting algorithm can assign a different weight to each keyword based on one or more of the following criteria (i) if a first keyword is associated with a DOM node of the webpage that is deeper in the DOM branch in comparison to a second keyword associated with a DOM node higher in the branch, the first keyword weighs less than the second keyword; (ii) more weight is given to a keyword that appears more frequently in the webpage; (3) if a keyword is formatted in a style that reflects its importance in the webpage (e.g., a unique heading, font, font size, etc.), the keyword is assigned a higher weight; or (4) if a keyword is located at a more important location in the webpage (e.g., higher on the page), the keyword is assigned a higher weight. The weights can be specified or changed through manual modification by experts. In some embodiments, the tag management system 100 updates the tag of a webpage at step 216 using only those keywords that have relatively high weights (e.g., weights greater than a predefined threshold). Therefore, if the same set of keywords is generated for two webpages with different DOM structures, the resulting keywords used to update the tags of the webpages may be different due to the different weights assigned to the keywords.

In some embodiments, the tag management system 100 can store the keywords of a particular version of a webpage in the data repository 112. For example, each keyword can be stored in the repository 112 correlated to the DOM node to which the keyword describes, such as in the form of: <DOM path for a node, one or more keywords>. Other metadata can be stored under the same DOM path, including data related to weighing the various keywords of that listing. Each listing can be correlated to a particular version of the webpage so that comparisons between versions created at different points in time can be easily performed. In some embodiments, experts can edit the listings in the data repository 112, such as manually adding or removing one or more keywords.

In some embodiments, the tag management system 100 can notify an owner of a webpage after the tag associated with the webpage has been automatically or manually updated. Such notification allows the owner to review the update and initiate modifications if needed.

In some embodiments, instead of determining new keywords for the entire content of a webpage at step 208, which can be a computationally-intensive and costly endeavor, the tag management system 100 can lower this cost by reducing the amount of content to be reviewed and for which keywords need to be automatically determined. For example, in a first scenario where new content is added in the current version, keyword determination at step 208 can be executed only on the section of the DOM model that correlates to the newly added content. During update at step 216, the keywords generated for the new content can be added to the listing in the data repository 112 under the DOM path where the new content is located. In a second scenario where content is modified in the current version, keyword determination at step 208 can be executed on the section of the DOM model that corresponds to the altered content to determine if any existing keywords need to be removed or any new keywords need to be added. Subsequently, at step 216, the corresponding listing in the data repository 112 under the DOM path where alteration has occurred can be modified. In a third scenario where content is removed in the current version, no new keywords need to be determined at step 208. Instead, at step 216, existing keywords corresponding to the removed content are removed from the listing in the data repository 112 under the DOM path where the removal has occurred. In a fourth scenario where content is moved is from one section of the webpage to another section, existing keywords corresponding to the removed content are deleted from the listing in the data repository 112 under the DOM path where the removal occurred. In addition, the deleted keywords are added to the listing in the data repository under the DOM path to which the content has been relocated. In general, modifications to a webpage can be detected by source control tools after a user modifies the page and checks it into the source control systems. In some embodiments, the tag management system 100 can execute batch processing on a group of webpages to detect changes and determine which of the four update scenarios to apply.

FIG. 3 shows an exemplary content prediction method 300 for generating one or more keywords for a webpage at step 208 of the process 200. In general, the input to the algorithm can be the DOM model of the webpage, such as the DOM model corresponding to a current version of the webpage, and the output can be one or more keywords describing the webpage, along with a likelihood score measuring the accuracy of the keywords. The method 300 generally models a domain expert's decision-making process concerning characterization of webpage content by automatically assigning one or more keywords to the page. As shown in FIG. 3, the method 300 includes two phases 302 and 304. The first phase 302, as illustrated by the flow diagram of FIG. 4, involves creating and maintaining a trained prediction model by performing a data training process on a set of well pre-categorized webpages. The second phase 304, as illustrated by the flow diagram of FIG. 5, involves assigning one or more keywords to a new webpage based on the trained prediction model. In addition, the second phase 304 can estimate a level of confidence associated with the keyword assignment by generating a likelihood score.

FIG. 4 shows an exemplary method 400 for creating and maintaining a trained prediction model (step 302 of FIG. 3). To start the training process at step 401, a raw sample set of words and/or phrases W is collected from a set of existing webpages P, based on which a set of association rules R (expressed as W $\Rightarrow$ K) is formed that maps each word or phrase in the raw sample set W to at least one keyword in a keyword set K. The words and/or phrases in the set W can be collected from the DOM model of each of the webpages in the set P. The keywords in the set K can be collected from the keywords summarizing the webpages in the set P. In addition, various properties are calculated to measure the strength of each mapping in the rule set R. Exemplary properties for each association rule include at least one of a lift measurement, a conviction measurement, a support measurement or a distance score. The following definitions are provided for the training process:

Set P is defined as P={$p_1, p_2, \ldots p_m$}, which consists of m webpages with well-defined keywords. In some embodiments, the training webpages are selected by experts from a particular domain with similar content (e.g., webpages from within the financial space).

Set W is defined as W={$w_1, w_2, \ldots w_n$}, where each element $w_i$ is a word or phrase (hereinafter referred to as an "item") extracted from at least one of the webpages of the set P. Set W thus forms a raw sample of items for the training process.

Set K is defined as K={$k_1, k_2, \ldots k_t$}, which consists of t keywords predefined by experts to categorize or summarize the webpages of the set P. For example, K={401K, 529b, check account} is a set of keywords summarizing three categories of webpages. A keyword can belong to the item set W (K $\subseteq$ W). Alternatively, a keyword does not belong to the item set W. For example, in the case where a webpage describes "a company sponsored retirement plan where your contribution will be matched up to 5% of your salary," the keyword "401K" can be assigned to the webpage even though the word "401K" is not explicitly mentioned in the webpage.

An association rule $R_i$ is defined as $X_i \Rightarrow K_i$, where item set $X_i$ is a subset of W that contains one or more items (i.e., words or phrases), and set $K_i$ is a subset of K that contains one or more keywords. A rule $R_i$ means that if elements of set $X_i$ appear in a webpage, then the webpage can be assigned the keywords in the corresponding keyword set $K_i$ under certain probability. Many of such rules can be formulated between the sets W and K based on the existing webpages P. A collection of these rules is denoted as R.

Supp($X_i$)=coverage($X_i \Rightarrow K_i$)=P($X_i$) is defined as the support of item set $X_i$, which measures the frequency that the item set $X_i$ appears in the webpage set P. A user can define a threshold (supp$_{th}$) to specify the minimum support required for an item set $X_i$.

Conf $$(X_i \Rightarrow K_i) = \frac{supp(Xi \cup Ki)}{supp(Xi)}$$

is defined as the confidence in the rule $R_i$ (i.e., $X_i \Rightarrow K_i$), which measures the probability of seeing the rule's keyword set $K_i$ in the webpage set P under the condition that the webpage set P also contains the item set $X_i$.

Lift $$(X_i \Rightarrow K_i) = \frac{conf(Xi \Rightarrow Ki)}{supp(Ki)} = \frac{P(Xi \cup Ki)}{P(Xi)P(Ki)}$$

measures the number times more often that item set $X_i$ and keyword set $K_i$ occur together than they appear independently. A user can define a lift threshold ($lift_{th}$) to specify the minimum lift expected.

Conviction $$(X_i \Rightarrow K_i) = \frac{1 - supp(Ki)}{1 - conf(Xi \Rightarrow Ki)} = \frac{P(Xi)P(\neg Ki)}{P(Xi \cup \neg Ki)}$$

measures the probability that the item set $X_i$ appears without the keyword set $K_i$ if they are correlated with the actual frequency of the appearance of $X_i$ without $K_i$. The conviction measurement is a supplement of the lift measurement since the conviction measurement uses information involving the absence of the keyword set $K_i$. A user can define a conviction threshold ($conviction_{th}$) to specify the minimum conviction expected.

A distance score $$\xi = \left( \sum_{j=1}^{|X_i|} \frac{1}{L(w_j)} \right)^{-1}$$

indicates the overall importance of an item set $X_i$ based on the importance of each individual item $w_j$ in the item set, As shown, $L(w_j)$ denotes a user-defined weight function that specifies the importance of an item of the item set $X_i$ in a webpage. For example, given two webpages with the same item set, but the items in the item set of the first webpage have higher importance (e.g., are displayed with bolder or larger font in the webpage) than the items of the second item set, then the distance score for the first webpage can be higher in value than the distance score for the second webpage.

In some embodiments, data related to the formulation of a training model can be stored in the data repository 112, including sets P, W, K and R and measurements related to support, confidence, lift, conviction and distance.

At step 402, item set $X_1$ and property set $D_1$ are defined and initialized. At step 404, a for loop is used to assign values to the item set $X_1$ and the property set $D_1$. The goal of step 404 is to extract a set of not only selective, but also comprehensive items from the raw sample set W. The for loop of step 404 can be used to eliminate insignificant items in the item set W and formulate an initial set $D_1$ of property vectors, where each property vector corresponds to an element in the item set $X_1$. As shown, the for loop is as follows:

for each $w_i \in W$
$X_1 \leftarrow \{w_i | lift(w_i \Rightarrow K) > lift_{th}, conviction(w_i \Rightarrow K) > conviction_{th}, supp(w_i) > supp_{th}\}$
If $w_i \in X_1$
$D_1 \leftarrow \{\xi_i | lift(w_i \Rightarrow K), conviction(w_i \Rightarrow K), supp(w_i)\}$
end Specifically, at step 404a, for each item $w_i$ in the item set W, given a rule that associates $w_i$ to a keyword set $K_i$ ($w_i \Rightarrow K_i$), the item $w_i$ is only added to the item set $X_1$ if one or more of the following constraints are satisfied: (i) the lift of the rule ($lift(w_i \Rightarrow K_i)$) is greater than a user-defined lift threshold—$lift_{th}$, (ii) the conviction of the rule ($conviction(w_i \Rightarrow K_i)$) is greater than a user-defined conviction threshold—$conviction_{th}$, or (iii) the support of the item $w_i$ is greater than a user-defined support threshold—$supp_{th}$. These constraints are used to eliminate those items in W that appear too few times in the training webpages P or too many times in the training webpages P. Fewer or more constraints can be used to select the significant items from the set W for addition to the set $X_1$.

At step 404b, for each item $w_i$ in the item set W, if the item $w_i$ is added to the set $X_1$, a property vector is defined for that item as a collection of four measurements including a lift value, a conviction value, a support value and a distance score $\xi$, as defined above. In general, these four measurements in a property vector are statistical properties for evaluating the strength of a rule that maps an element $w_i$ of the set $X_1$ to a corresponding set of one or more keywords $K_i$ determined from the training data. Each property vector, which corresponds to a particular item of set $X_1$, is added to the property set $D_1$ at step 404b. Furthermore, a set of rules $R_1$ can be assembled at step 404, where each rule maps an element $w_i$ of the set $X_i$ to its corresponding keyword set $K_i$. Hence, the rule set $R_1$ can be seen as a pruned version of the initial rule set R.

At step 406, a while loop is implemented to iteratively form additional higher level item sets. As shown, the while loop is as follows:

while $X_{k-1} \neq \#0$
$\cup_k X_k = \cup_{k-1} X_{k-1} \cup$ Apriori $(X_{k-1}, supp_{th})$ /* on $K^{th}$ set level */
$D_k \leftarrow \{\xi_i | lift(w_i \Rightarrow K), conviction(w_i \Rightarrow K), supp(w_i)\}$ for all $x_i \in X_k$
$k \leftarrow k+1$
end Specifically, at each level k (k is 2 or great) during an iteration of the while loop, an apriori algorithm is used to form a super set $X_k$ (step 406a), where each element of the super set $X_k$ consists of a combination of two elements from the previous item set $X_{k-1}$ and the combined element is only added to the super set $X_k$ if it satisfies certain constraints to ensure that, for example, the frequency of the combination within the training webpages exceeds a given threshold $Supp_{th}$. Additional constraints can be used to determine if a combined element should be added to the super set $X_k$. A person of ordinary skill in the art understands that any suitable apriori algorithm can be used in this context, such as the apriori algorithm described in "Fast Algorithms for Mining Association Rules in Large Databases" by Rakesh Agrawal, R. S., VLDB (pp. 487-499), 1994.

At step 406b, a property set $D_k$ is calculated for the superset $X_k$, where each element of $D_k$ is a property vector corresponding to an element of $X_k$. A property vector can include a distance score, a lift measurement, a conviction measurement and/or a support measurement. The measurements in a property vector evaluate the strength of a rule that maps an element of the set $X_k$ to a corresponding set of one or more keywords $K_k$ determined from the training data. In general, the higher the level at which the super set is formed, the fewer elements the super set contains, but the better the corresponding property set (i.e., more confidence, support and significance) due to the iterative pruning process. Furthermore, a set of rules $R_k$ can be assembled at each iteration of the while loop, where each rule maps an element of the super set $X_k$ to its corresponding keyword set $K_k$.

The level count k is initiated at step 402 and is incremented at each iteration of the while loop (step 406c) to form another super set until no further combinations can be made based on the previous super set. At step 408, the process 400 outputs all the item sets, including set $X_1$ generated at step 404 and sets $X_2 \ldots X_n$ generated at step 406. Step 408 also outputs all the property sets, including set $D_1$ generated at step 404 and sets $D_2 \ldots D_n$ generated at step 404 corresponding to the item sets $X_1 \ldots X_n$. In addition, step 408 can output all the rule sets, including rule set $R_1$ generated at step 404 and rule sets $R_2 \ldots R_n$ generated at step 404 corresponding to the item sets $X_1 \ldots X_n$.

As an example, given a set W={milk, eggs, bread, cookie, oil}, set $X_1$ can have three elements including {milk, eggs, bread}, where {oil} is eliminated for appearing too frequently or not enough in the training data. Set $X_2$ can have two elements including {{milk, eggs}, {milk bread}}, where the combination {eggs, bread} is eliminated for appearing not enough in the training data according to the apriori algorithm. This iterative process can continue under step 406 until no combination is possible to form any additional super sets.

FIG. 5 shows an exemplary method 500 for assigning one or more keywords to a given webpage based on the trained prediction model generated from the method of FIG. 4. At step 502, inputs to the method 500 are provided. These inputs include a new webpage $\tilde{P}$ for which keywords determination is required. The new webpage $\tilde{P}$ generally does not belong to the set of webpages used in the method 400 of FIG. 4 for training purposes. The trained model, which includes the item sets X, their corresponding property sets D, and rule sets R, is also supplied as an input to the method 500.

At step 504, the new webpage $\tilde{p}$ is scanned to extract an initial set of words or phrases $\tilde{W}$, where each word or phrase is denoted as $\tilde{W}_i$, and $\tilde{W}_i$ belongs to the initial raw sample set W. Thus, $\tilde{W}_i$, has the following property: $\tilde{W}_i \in \tilde{p}$, $\tilde{W}_i \in W$. In some embodiments, the scanning is performed on the DOM model of the webpage $\tilde{p}$. The set of words or phrases $\tilde{W}$ can be randomly chosen from the webpage $\tilde{p}$. At step 506, a hash function is used to select one or more items sets $\tilde{X}$ from the item sets X of the trained model based on the initial set $\tilde{W}$. The hash function can be in the form of: $\tilde{X} = \text{hash\_func}(\tilde{W})$. Specifically, each of the selected item set $\tilde{X}_t$ includes all the words or phrases in the set $\tilde{W}$. Each item set $\tilde{X}_t$ is mapped to a set of keywords $K_i$ under an association rule $R_i$, as determined by the trained model.

At step 508, a property vector $\tilde{d}_t$ is calculated and assembled for each item set $\tilde{X}_t$, where the property vector includes a distance score, a lift measurement, and a support measurement. All the property vectors form a property set $\tilde{D}$. At step 510, a likelihood score $s_i$ is calculated for each rule $R_i$ that maps an item set $\tilde{X}_t$ to a keyword set $K_i$ using the equation: $s_{i=distance}(\tilde{d}_t, c_j)$. In this equation, $\tilde{d}_t$ is the property vector of the item set $\tilde{X}_t$ and $c_i = \{1, \text{lift}_{th}, \text{conviction}_{th}, \text{supp}_{th}\}$ denotes the ideal property vector (i.e., the center of a 4-dimensional coordinate system for the property vectors). Hence, the likelihood score $s_i$ measures the amount of deviation between a particular rule $R_i$ that maps an item set $\tilde{X}_t$ to a keyword set $K_i$ and an ideal mapping. Subsequently, a maximum likelihood score is determined from the all the likelihood scores S using the following equation: $\max_{|\tilde{D}|S_j} = \max_{|\tilde{x}||K|} P(x_i, 43_j)$. The rule $R_{max}$ corresponding to the highest likelihood score can be chosen, where the keyword set $K_{max}$ of the rule $R_{max}$ is likely to best characterize the new webpage $\tilde{p}$. Hence, at step 512, the method 500 can output the keyword set $K_{max}$ as the new keywords for the webpage $\tilde{P}$ that can be used to automatically update the tag of the webpage $\tilde{P}$ (i.e., at step 216 of the process 200 of FIG. 2).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A computer-implemented method for automatically updating a tag embedded in a webpage that summarizes a current version of the webpage, the method comprising:

extracting, by a computing device, a first model representative of the current version of the webpage, the first model including nodes defining a hierarchy of elements of the current version of the webpage;

comparing, by the computing device, the first model with a second model corresponding to a previous version of the webpage to detect one or more changes to the webpage;

determining by the computing device, at least one keyword corresponding to the current version of the webpage if the changes exceed a threshold, wherein determining the keyword comprises:

extracting an item set of words or phrases from the current version of the webpage;

selecting a rule from a trained set of rules based on the item set of extracted words or phrases, the rule defining (1) an association of the item set to a keyword and (2) a property vector that measures quality of the association; and computing a maximum likelihood score based on the property vector corresponding to the selected rule, the maximum likelihood score representing a probability of relationship between the selected rule and the corresponding keyword;

comparing, by the computing device, the keyword corresponding to the current version of the webpage with at least one keyword corresponding to the previous version of the webpage; and updating, by the computing device, the tag of the webpage to include the keyword corresponding to the current version depending on the comparison and the likelihood score.

2. The computer-implemented method of claim 1, wherein each of the first or second model is a document object model (DOM).

3. The computer-implemented method of claim 1, further comprising notifying an owner of the webpage when the tag of the webpage is updated to include the keyword.

4. The computer-implemented method of claim 3, further comprising permitting manual edit of the keyword corresponding to the current version of the webpage if the likelihood score is lower than a threshold.

5. The computer-implemented method of claim 1, further comprising storing at least one of the first model, the second model, the keyword corresponding to the current version of the webpage, the keyword corresponding to the previous version of the webpage or the trained set of rules in a data repository.

6. The computer-implemented method of claim 1, wherein the keyword corresponding to the current version of the webpage is associated with a node of the first model.

7. The computer-implemented method of claim 1, further comprising storing the keyword in a data repository correlated to a node and a webpage version.

8. The computer-implemented method of claim 1, further comprising prohibiting updating the tag of the webpage if the keyword corresponding to the current version of the webpage is substantially the same as the at least one keyword corresponding to the previous version of the webpage.

9. The computer-implemented method of claim 1, further comprising creating the trained set of rules in a prediction model comprising:

extracting a set of elements from a set of known webpages, wherein each element corresponds to a word or phrase appearing in one of the known webpages;

determining a set of keywords, wherein each keyword categorizes at least one of the set of known webpages;

determining an initial set of rules, wherein each rule maps an element in the set of elements to at least one keyword in the set of keywords;

generating, at a first level, (1) a candidate set of elements by pruning the set of elements to eliminate one or more insignificant elements based on a plurality of constraints, (2) a first set of rules, each rule mapping an element in the candidate set to a keyword based on the initial set of rules, and (3) a first set of property vectors measuring quality of mapping of the first set of rules; and generating, at each of one or more additional levels, (1) a superset of entities formed by iteratively combining two or more elements of the candidate set, each entity in the superset comprising two or more of the elements; (2) a superset of rules, each rule mapping an entity to a keyword based on the initial set of rules; and (3) an additional set of property vectors measuring quality of mapping of the superset of rules, wherein the trained set of rules comprises the first set of rules and the superset of rules created at each of the one or more additional levels.

10. The computer-implemented method of claim 1, further comprising:

detecting user access to the current version of the webpage; and updating a running total for the keyword based on the user access, wherein the running total measures an extent of user interest in a topic corresponding to the keyword.

11. The computer-implemented method of claim 1, wherein comparing the first model with the second model comprises running an extensible markup language (XML) parser on each model and comparing the models based on the parsed results.

12. The computer-implemented method of claim 1, wherein comparing the keyword corresponding to the current version of the webpage with at least one keyword corresponding to the previous version of the webpage comprises:

weighting each keyword based on at least one of the corresponding node in the hierarchy, the frequency of the keyword, the formatting of the keyword or the location of the keyword; and comparing the weighted keywords corresponding to the current and previous versions of the webpage.

13. A computer-implemented system for automatically updating at least one tag embedded in a webpage that summarizes a current version of the webpage, the system comprising:

a processor;

a scope difference determination module configured to:
retrieve a first model representative of the current version of the webpage, the first model including nodes defining a hierarchy of elements of the current version of the webpage; and
compare the first model with a second model corresponding to a previous version of the webpage to detect one or more changes to the webpage;

a content prediction module configured to determine at least one keyword corresponding to the current version of the webpage if the changes exceed a threshold, the content prediction module comprises a decision making module configured to:
extract a set of words or phrases from the current version of the webpage;
select a rule from a trained set of rules based on the extracted word or phrase, each rule defining (1) an association of two or more words or phrases to a keyword and (2) a property vector that measures quality of the association; and
compute a maximum likelihood score based on the property vector corresponding to the selected rule, the maximum likelihood score representing a probability of relationship between the selected rule and the corresponding keyword; and a post processing module configured to:
compare the keyword corresponding to the current version of the webpage with at least one keyword corresponding to the previous version of the webpage; and
update the tag of the webpage to include the keyword corresponding to the current version based on the comparison and the likelihood score.

14. The computer-implemented system of claim 13, wherein each of the first or second model is a document object model (DOM).

15. The computer-implemented system of claim 13, wherein the post processing module is further configured to notify an owner of the webpage when the tag of the webpage is updated to include the keyword.

16. The computer-implemented system of claim 13, wherein the post processing module is further configured to allow manual edit of the one or more keywords corresponding to the current version of the webpage.

17. The computer-implemented system of claim 13, wherein the post processing module is further configured to prohibit updating the tag of the webpage if the keyword corresponding to the current version of the webpage is substantially the same as the keyword corresponding to the previous version of the webpage.

18. The computer-implemented system of claim 13, further comprising a data repository configured to store at least one of the first model, the second model, the keyword corresponding to the current version of the webpage, the keyword corresponding to the previous version of the webpage or the trained set of rules.

19. The computer-implemented method of claim 18, wherein the data repository is adapted to store the keyword correlated to a respective node and webpage version.

20. The computer-implemented system of claim 13, wherein the content prediction module further comprises a training module configured to generate the trained set of rules, the training module is adapted to:

extract a set of elements from a set of known webpages, wherein each element corresponds to a word or phrase appearing in one of the known webpages;

determine a set of keywords, wherein each keyword categorizes at least one of the set of known webpages;

determine a set of rules, wherein each rule maps an element in the set of elements to at least one keyword in the set of keywords;

generate, at a first level, (1) a candidate set of elements by pruning the set of elements to eliminate one or more insignificant elements based on a plurality of constraints, (2) a first set of rules, each rule mapping an element in the candidate set to a keyword based on the initial set of rules, and (3) a first set of property vectors measuring quality of mapping of the first set of rules; and generate, at each of one or more additional levels, (1) a superset of entities formed by iteratively combining two or more elements of the candidate set, each entity in the superset comprising two or more of the elements; (2) a superset of rules, each rule mapping an entity to a keyword based on the initial set of rules; and (3) an additional set of property vectors measuring quality of mapping of the superset of rules, wherein the trained set of rules comprises the first set of rules and the superset of rules created at each of the one or more additional levels.

21. The computer-implemented system of claim 13, further comprising an analyzer configured to:
  detect user access to the current version of the webpage; and
  update a running total for the keyword based on the user access, wherein the running total measures an extent of user interest in a topic corresponding to the keyword.

22. A non-transitory computer readable medium for automatically updating at least one tag embedded in a webpage that summarizes a current version of the webpage, the non-transitory computer readable medium being configured to cause data processing apparatus to:
  retrieve a first model representative of the current version of the webpage, the first model including nodes defining a hierarchy of elements of the current version of the webpage;
  compare the first model with a second model corresponding to a previous version of the webpage to detect one or more changes to the webpage;
  determine at least one keyword corresponding to the current version of the webpage if the changes exceed a threshold comprising:
    extract a set of words or phrases from the current version of the webpage;
    select a rule from a trained set of rules based on the extracted word or phrase, each rule defining (1) an association of two or more words or phrases to a keyword and (2) a property vector that measures quality of the association; and
    compute a maximum likelihood score based on the property vector corresponding to the selected rule, the maximum likelihood score representing a probability of relationship between the selected rule and the corresponding keyword;
  compare the keyword corresponding to the current version of the webpage with at least one keyword corresponding to the previous version of the webpage; and
  update the tag of the webpage to include the keyword corresponding to the current version depending on the comparison and the likelihood score.

* * * * *